United States Patent Office 3,395,017
Patented July 30, 1968

3,395,017
SILVER HALIDE PHOTOGRAPHIC ELEMENT CONTAINING ACIDIC POLYMETHINE DYES AND HOLOPOLAR CYANINES
Edward B. Knott, Wealdstone, Harrow, Middlesex, England, assignor to Eastman Kodak Company, Rochester, N.Y., a corporation of New Jersey
No Drawing. Filed July 2, 1964, Ser. No. 380,055
10 Claims. (Cl. 96—84)

ABSTRACT OF THE DISCLOSURE

Certain acidic polymethine dyes and holopolar cyanine dyes derived by reacting (1) quaternized hydroxyarylmethylenerhodanines, hydroxyheterocyclylmethylenerhodanines and β-substituted ethylidenerhodanines with (2) a cyclammonium quaternary salt containing an active methyl group are useful optical sensitizing dyes. The dyes and light-sensitive photographic elements containing them are believed to be novel. 3-ethoxycarbonylmethyl-5-[3 - ethoxycarbonylmethyl-5-(4-hydroxy-2-oxochromen-3-ylmethylene) - 4 - oxothiazolidin-2-ylidene]-2-thiothiazolid-4-one, anhydro-[3-ethyl - 2 - benzothiazole] [3-ethoxycarbonylmethyl-5-(4-hydroxy - 2 - oxochromen - 3-ylmethylene)-4-oxo - 2 - thiazoline]methinecyanine hydroxide and 5-[5-(2,2 - dicyanovinyl)-3-ethyl-4-hydroxythiazolin-2-ylidene]-3-ethyl-2-thiothiazolid-4-one, for example are illustrative dye compounds.

---

This invention relates to acidic polymethine dyes and holopolar cyanine dyes, to methods for preparing such dyes, including certain dye intermediates therefor, and to photographic silver halide emulsions and photographic elements containing these new dyes.

The new dyes of the invention may be represented, in general, by the following formulas:

(1)
$$\ominus A-CH=\overset{O=C-N-R}{\underset{X}{C}}\diagdown\overset{\cdots Z\cdots}{C=CH-C(=CH-CH)_{n-1}=\overset{\oplus}{N}-R_1}$$

and (2)
$$HA-CH=\overset{O=C-N-R}{\underset{X}{C}}\diagdown\overset{O=C-}{\underset{C(=CH-CR_2)_{d-1}=C}{\diagdown Q}}$$

wherein each A represents certain conjugated groups of atoms containing an acidic hydrogen atom, X represents a sulfur oxygen or selenium atom or a —'NR₀ group in which R₀ represents hydrogen, an alkyl group (e.g., methyl, propyl, butyl, etc.), and an aryl group (e.g. phenyl, tolyl, etc.), and $d$, $n$, R, $R_1$, $R_2$, Q and Z are as defined hereinafter. The dyes of Formula 1 are holopolar in character.

More specifically, the holopolar dyes coming under above Formula 1 include those represented by the general formulas:

I.
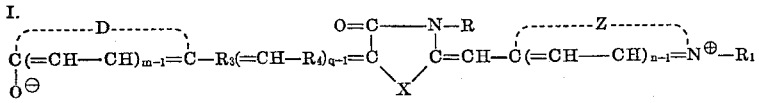

II.
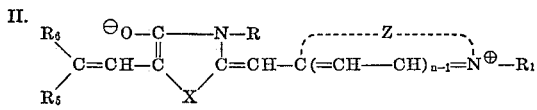

while the complex dyes coming under above Formula 2 include those represented by the formulas:

III.
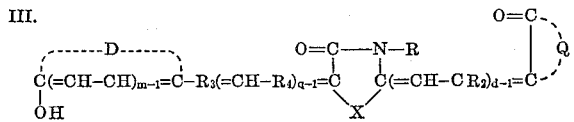

IV.
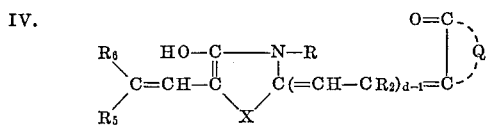

wherein X is as previously defined, each of $d$, $n$ and $q$ represents a positive integer of from 1 to 2, $R_1$ represents a substituted or unsubstituted alkyl group of from 1–12 carbon atoms (e.g., methyl, ethyl, propyl, isopropyl, butyl, isobutyl, amyl, decyl, dodecyl, β-hydroxyethyl, γ-hydroxypropyl, β-methoxyethyl, β-ethoxyethyl, allyl, benzyl, β-phenylethyl, carboxymethyl, β-carboxyethyl, γ-carboxypropyl, β-acetoxyethyl, β-carbethoxyethyl, etc.), R represents any of the groups defined for $R_1$ and in addition a phenyl group (e.g., phenyl, tolyl, etc.), $R_2$ represents a hydrogen atom, or an alkoxy group or alkylthio group of from 1–4 carbon atoms (e.g., methoxy, ethoxy, propoxy, butoxy, ethylthio, etc.), $R_3$ represents a methine group substituted or not (e.g., —CH=, —C($C_2H_5$)=, —C($C_6H_5$)=, etc.), $R_4$ represents a methine group substituted or not (e.g., —CH=, —C($CH_3$)=,

—C($C_2H_5$)=

—C($C_6H_5$)=, etc., $R_5$ represents the cyano group, the nitro group, a nitrophenyl group or a nitronaphthyl group (e.g., p-nitrophenyl, α-nitronaphthyl, etc.), or a carbalkoxy group (e.g. carbomethoxy, carbethoxy, etc.), $R_6$ represents the cyano group, D represents a bivalent group including (—CH=CH)$_{p-1}$—,

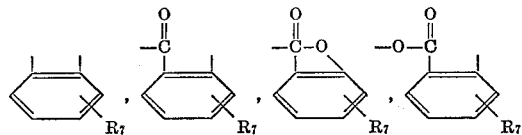

wherein $m$ and $p$ each represents an integer of from 1 to 2 and wherein when $m$ is 1 $p$ is 2 and D is

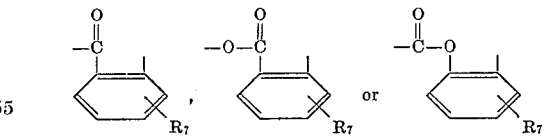

and when $m$ is 2 $p$ is 1 and D is vinylene or

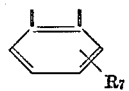

and when m is 2 p is 1 and D is vinylene or;
R₇ represents a group such as, the hydrogen atom a lower alkyl group, Q represents the non-metallic atoms required to complete a heterocyclic nucleus containing from 5 to 6 atoms in the heterocyclic ring selected from the class consisting of a thiazolone nucleus, such as, a 2,4(3,5)-thiazoledione nucleus (e.g. 2,4(3,5)-thiazoledione,
3-alkyl-2,4(3,5)-thiazolediones such as 3-ethyl-2,4(3,5)-thiazoledione, etc.,
3-phenyl-2,4(3,5)-thiazoledione,
3-α-naphthyl-2,4(3,5)-thiazoledione, etc.),
a 2-thio-2,4(3,5)-thiazoledione (i.e., rhodanine) nucleus (e.g. 3-alkylrhodanines,
such as 3-ethyl rhodanine,
3-allylrhodanine, etc.,
3-carboxyalkylrhodanines, such as,
3-(2-carboxyethyl) rhodanine,
3-(4-carboxybutyl) rhodanine, etc.,
3-sulfoalkylrhodanines, such as,
3-(2-sulfoethyl) rhodanine,
3-(4-sulfobutyl) rhodanine, etc.,
3-phenyl rhodanine,
3-α-naphthylrhodanine,
3-(1-benzothiazyl) rhodanine, etc.),
a 2-thio-2,5(3,4)-thiazoledione nucleus, such as,
3-alkyl (e.g. 3-methyl, 3-ethyl, etc.)
2-thio-2,5(3,4)-thiazolediones, etc.),
a 2-alkyl mercapto-4(5)-thiazolone nucleus (e.g. 2-ethylmercapto-4(5)-thiazolone, etc.),
a thiazolidone nucleus (e.g. 4-thiazolidone or its alkyl (e.g. ethyl, etc.),
3-phenyl or 3-α-naphthyl derivatives, etc.),
a 2-alkylphenylamino-4(5)-thiazolone nucleus (e.g. 2-ethylphenylamino-4(5)-thiazolone, etc.),
a 2-diphenylamino-4(5)-thiazolone nucleus,
a 5(4)-thiazolone nucleus (e.g. 2-ethylthio-5(4)-thiazolone,
2-benzylthio-5(4)-thiazolone, etc.),
an oxazolone nucleus such as a 2-thio-2,4(3,5)-oxazoledione nucleus (e.g. 3-alkyl-2-thio-2,4(3,5)-oxazolediones such as 3-ethyl-2-thio-2,4(3,5)-oxazoledione, etc.,
a carboxyalkyl-2-thio-2,4(3,5)-oxazoledione such as 3-(3-carboxypropyl)-2-thio-2,4(3,5)-oxazoledione, etc.,
a sulfoalkyl-2-thio-2,4(3,5)-oxazoledione such as 3-(2-sulfoethyl)-2-thio-2,4(3,5)-oxazoledione, etc.),
a 2-imino-2,4(3,5)oxazolone nucleus (pseudohydantoin),
a 5(4)-oxazolone nucleus (e.g. 2-phenyl-5(4)-oxazolone, 2-ethyl-5(4)-oxazolone, etc.),
a 5(4)-isoxazolone nucleus e.g. 3-phenyl-5(4)-isoxazolone, etc.),
an imidazolone nucleus such as a 2,4(3,5)-imidazoledione nucleus (e.g. 2,4(3,5)-imidazoledione (hydantoin) or its 3-alkyl such as ethyl, etc.,
3-phenyl or 3-α-naphthyl derivatives as well as its 1,3-dialkyl such as 1,3-diethyl, etc.,
1-alkyl-3-phenyl such as 1-ethyl-3-phenyl,
1-alkyl-3-α-naphthyl such as 1-ethyl-3-α-naphthyl, etc.,
1,3-diphenyl, etc. derivatives),
a 2-thio-2,4(3,5)-imidazoledione nucleus (e.g. 2-thio-2,4(3,5)- imidazoledione (2-thiohydantoin) or its 3-alkyl and substituted alkyl such as 3-ethyl, 3-(2-carboxyethyl), 3-(4-sulfobutyl), etc.,
3-phenyl or 3-α-naphthyl derivatives as well as its 1,3-dialkyl such as 1,3-diethyl, etc.,
1-alkyl-3-phenyl such as 1-ethyl-3-phenyl, etc.,
1-alkyl-3-naphthyl such as 1-ethyl-3-α-naphthyl, etc.,
1,3-diphenyl, etc. derivatives,
a 2-alkylthio-5(4)-imidazolone nucleus (e.g. 2-propylthio-5(4)-imidazolone, etc.),
a thionaphthenone nucleus (e.g. 2(1)-thionaphthenone, 1(2)-thionaphthenone, etc.),
a pyrazolone nucleus (e.g. pyrazolone or its 1-alkyl such as methyl, ethyl, etc.,
1-phenyl, 1-naphthyl such as 1-α-naphthyl, 3-alkyl such as methyl, ethyl, etc.,
3-phenyl, 3-naphthyl such as 3-α-naphthyl,
1-alkyl-3-phenyl such as 1-methyl-3-phenyl, etc.,
3-alkyl-1-phenyl such as 3-methyl-1-phenyl, etc.,
1,3-dialkyl such as 1,3-dimethyl, etc.,
1,3-diphenyl, etc. derivatives),
an oxindole nucleus (e.g. 2,3-dihydro-3-ketoindole and like five membered heterocyclic nuclei),
a 2,4,6-triketohexahydropyrimidine nucleus (e.g. 2,4,6-triketohexahydropyrimidine or barbituric acid,
2-thio-4,6-diketohexahydropyrimidine or thiobarbituric acid,
as well as their 1-alkyl such as 1-ethyl, etc. or 1,3-dialkyl, such as,
1,3-diethyl, etc. derivatives),
a 3,4-dihydro-2(1)-quinolone nucleus (e.g. 3,4-dihydro-2(1)-quinolone or dihydrocarbostyril, etc.,
a 3,4-dihydro-2(1)-quinoxalone nucleus (e.g. 3,4-dihydro-2(1)-quinoxazolone or oxydihydroquinoxaline, etc.,
a 3-phenomorpholone (1,4,3-benzoxazine-3(4)-one or benzo-β-morpholone) nucleus (e.g. 3-phenomorpholone, etc.,
a 1,4,2 - benzothiazine - 3(4)-one (ketodihydrobenzoparathiazine) nucleus (e.g. ketodihydrobenzoparathiazine, etc.), and the like nuclei, and Z represents the non-metallic atoms necessary to complete a heterocyclic nucleus containing from 5 to 6 atoms in the heterocyclic ring selected from the class consisting of a thiazole nucleus (e.g., thiazole,
4-methylthiazole,
5-methylthiazole,
4-phenylthiazole,
5-phenylthiazole,
4,5-dimethylthiazole,
4,5-diphenylthiazole,
4-(2-thienyl)thiazole, etc.),
a benzothiazole nucleus (e.g., benzothiazole,
4-chlorobenzothiazole,
5-chlorobenzothiazole,
6-chlorobenzothiazole,
7-chlorobenzothiazole,
4-methylbenzothiazole,
5-methylbenzothiazole,
6-methylbenzothiazole,
5-bromobenzothiazole,
6-bromobenzothiazole,
4-phenylbenzothiazole,
5-phenylbenzothiazole,
4-methoxybenzothiazole,
5-methoxybenzothiazole,
6-methoxybenzothiazole,
5-iodobenzothiazole,
6-iodobenzothiazole,
4-ethoxybenzothiazole,
5-ethoxybenzothiazole,
tetrahydrobenzothiazole,
5,6-dimethoxybenzothiazole,
5,6-dioxymethylenebenzothiazole,
5-hydroxybenzothiazole,
6-hydroxybenzothiazole, etc.),
a naphthothiazole nucleus (e.g.,
α-naphthothiazole,
β,β-naphthothiazole,
5-methoxy-β-naphthothiazole,
5-ethoxy-β-naphthothiazole,
7-methoxy-α-naphthothiazole,
8-methoxy-α-naphthothiazole, etc.),
a thianaphtheno-7',6',4,5-thiazole nucleus (e.g., 4'-methoxythianaphtheno-7',6',4,5-thiazole, etc.), those of the oxazole series (e.g., 4-methyloxazole,
5-methyloxazole,
4-phenyloxazole,
4,5-diphenyloxazole,
4-ethyloxazole,
4,5-dimethyloxazole,
5-phenyloxazole, etc.), low in their acid forms), or as filter dyes in layers of photographic elements, or as acid wool dyes.

Since the dyes of above Formulas I and II are holopolar in character, they can also be properly represented in their equivalent forms, i.e. wherein D completes a ketone nucleus. For example, Formula I can also be written as follows:

IA
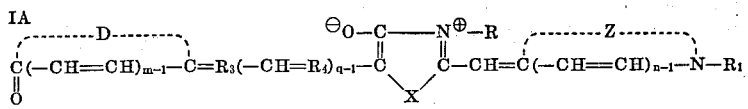

a benzoxazole nucleus (e.g., benzoxazole,
5-chlorobenzoxazole,
5-phenylbenzoxazole,
5-methylbenzoxazole,
6-methylbenzoxazole,
5,6-dimethylbenzoxazole,
4,6-dimethylbenzoxazole,
5-methoxybenzoxazole,
6-methoxybenzoxazole,
5-ethoxybenzoxazole,
6-chlorobenzoxazole,
5-hydroxybenzoxazole,
6-hydroxybenzoxazole, etc.), a naphthoxazole nucleus (e.g., α-naphthoxazole, β-naphthoxazole, β,β-naphthoxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., α-naphthoselenazole, β-naphthoselenazole, β,β-naphthoselenazole, etc.), a thiazoline nucleus (e.g., thiazoline, 4-methylthiazoline, etc.), a 2-quinoline nucleus (e.g.,quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), a 4-quinoline nucleus (e.g., quinoline, 6-methoxyquinoline, 7-methylquinoline, 8-methylquinoline, etc.), a 1-isoquinoline nucleus (e.g., isoquinoline, 3,4-dihydroisoquinoline, etc.), a 3,3-dialkylindolenine nucleus (e.g., 3,3-dimethylindolenine, 3,3,5-trimethylindolenine, 3,3,7-trimethylindolenine, etc.), a 2-pyridine nucleus (e.g., pyridine, 3-methylpyridine, 5-methylpyridine, 3,4-dimethylpyridine, 3,5-dimethylpyridine, 3,6-dimethylpyridine, 4,5-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), a 4-pyridinenucleus (e.g., 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), an imidazole nucleus (e.g., imidazole, 1-ethyl-4-phenylimidazole, 1,4-dimethylimidazole, 4-methyl-1-phenylimidazole, etc.), a benzimidazole nucleus (e.g., benzimidazole, 1-butylbenzimidazole, 1 - ethyl - 4,5 - dichlorobenzimidazole, etc.), a naphthimidazole nucleus (e.g., α-naphthimidazole, 1-ethyl-α-naphthimidazole, 1-butyl-β-naphthimidazole, 6-chloro-1-methyl-α-naphthimidazole, etc.), and the like nuclei.

The above defined dyes are useful either as sensitizers for photographic silver halide emulsions or as acid-base indicators (especially the dyes of Formulas III and IV, which give highly colored anions and are colorless or yellow in their acid forms), or as filter dyes in layers of photographic elements, or as acid wool dyes.

wherein $m$, $n$, $q$, R, $R_1$, $R_3$, $R_4$, X, D and Z are as previously defined.

It is, therefore, an object of the invention to provide new acidic polymethine dyes and holopolar cyanine dyes.

benzimidazole, 1-ethyl - 4,5 - dichlorobenzimidazole, Another object is to provide a method for preparing these new dyes, including new dye intermediate therefor. Still another object is to provide photographic silver halide emulsions containing the new dyes of the invention and photographic elements having one or more layers wherein one or more dyes of the invention are incorporated. Other objects will become apparent from a consideration of the general description and the specific examples.

In accordance with the invention, I prepare my new dyes represented by the above formulas by (1) first quaternizing an intermediate dye compound, for example, a hydroxymethylene rhodanine (oxonol) or a hydroxyheterocyclymethylenerhodanine (oxonol) or a β-substituted ethylidenerhodanine, represented by the general formulas:

V
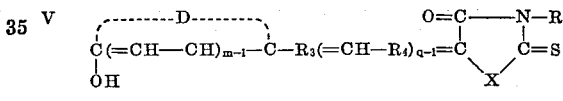

VI
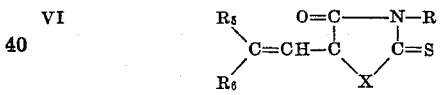

wherein each of $m$, $q$, R, $R_3$, $R_4$, $R_5$, $R_6$, X and D are as previously defined, with a quaternizing agent $$R_1X_1$$

wherein $R_1$ represents an alkyl group of from 1–3 carbons (e.g. methyl, ethyl, propyl, etc. groups and $X_1$ represents an acid anion (e.g. chloride, bromide, iodide, thiocyanate, sulfamate, methyl sulfate, ethyl sulfate, perchlorate, p-toluenesulfonate, and the like, and (2) then reacting the resulting quaternary salt with either (a) a cyclammonium quaternary salt selected from those of the general formula:

VIII
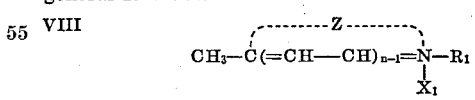

wherein $n$, $R_1$, $X_1$ and Z are as previously defined, to give the dyes of above Formulas I and II or with (b) a compound selected from those having the general formulas:

IX

and

X

wherein each of $R_2$ and Q are as previously defined, to give the dyes of Formulas III and IV.

The condensation reactions of the intermediate dye compounds of Formulas V and VI (quaternized) can be accelerated by basic condensing agents such as the trialkylamines (e.g. triethylamine, tripropylamine, triisopropylamine, tributylamine, etc.), N,N-dialkylanilines (e.g. N,N-dimethylaniline, N,N-diethylaniline, etc), N-alkylpiperidines (e.g. N-methylpiperidine, N-ethylpiperidine, etc.). Advantageously, the reactions are carried out in an inert solvent (depending somewhat on the solubility of the intermediates in the solvent), such as, lower alcohols (e.g. ethanol, propanol, isopropanol, butanol, etc. Basic solvents such as pyridine, quinoline, isoquinoline, 1,4-dioxane, etc. are particularly useful in the condensation reactions. Heat accelerates the reactions. Temperatures varying from ambient (ca. 25° C.) to reflux temperature of reaction mixtures can be employed.

PREPARATION OF INTERMEDIATES

The various intermediate dye compounds that can be employed in the preparation of the acidic polymethine and holopolar cyanine dyes of the invention can be prepared as illustrated in the following examples.

Example A.—3-ethoxycarbonylmethyl-5-(4-hydroxy-1-oxoisochromen-3-xylmethylene)-2-thiothiazolid-4-one

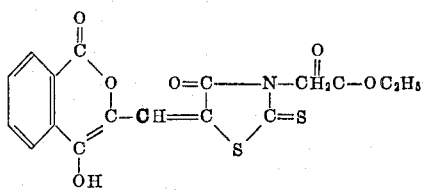

o-Carboxyphenacyl bromide (1.2 g.), 3-ethoxycarbonylmethyl-5-ethoxymethylenerhodanine (1.4 g.) and ethanol (10 cc.) were heated on a steam-bath to dissolve them and triethylamine (1.3 cc.) was added. The whole was refluxed for 5 min. and the purple solution was treated with concentrated hydrochloric acid until the colour changed to yellow. The dye separated as an ochre powder (1.6 g., 82%). It was recrystallized by dissolving in alcoholic triethylamine and making weakly acid with concentrated hydrochloric acid. It formed a yellow crystalline powder, M.P. ca. 280° C. (dec.) shrinking at 260° C. It sensitized a silver chlorobromide emulsion moderately with peaks at 585 and 625 mµ.

Example B.—3-ethyl-5-(4-hydroxyl-1-oxoisochromen-3-ylmethylene)-2-thiothiazolid-4-one This compound was obtained by the procedure of above Example A by replacing the 3-ethoxycarbonyl-5-ethoxymethylenerhodanine therein with an equivalent amount of 5-ethoxymethylene-3-ethylrhodanine, in a 73% yield. It formed bright yellow crystals which decomposed from 270° C. It sensitized a silver chloro-bromide emulsion in the same way as that of Example A.

Example C.—3-ethoxycarbonylmethyl-5-(4-hydroxy-2-oxochromen-3-ylmethylene)-2-thiothiazolid-4-one

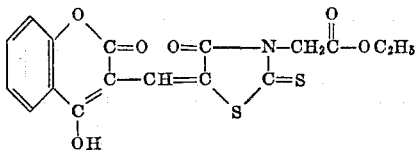

4-hydroxycoumarin (chroman-2,4-dione) (3.25 g.), 3-ethoxycarbonylmethyl - 5 - ethoxymethylenerhodanine (5.5 g.), ethanol (20 cc.) and triethylamine (3 cc.) was heated together on a steam-bath for 5 min. The orange liquor was acidified with dilute hydrochloric acid and chilled. The dye which crystallized (8.3 g.) was obtained (5.6 g., 72%) as fine orange needles, M.P. 261° C. from ethanol. It sensitized a silver chloro-bromide emulsion powerfully at 0.15 g./mole silver halide with a peak at 530 mµ extending to 590 mµ.

Example D.—3-ethyl-5-(3-hydroxy-1-oxoinden-2-ylmethylene)-2-thiothiazolid-4-one

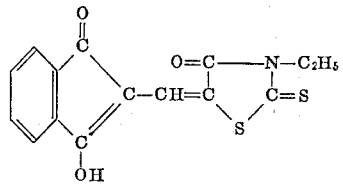

5-ethoxymethylene-3-ethylrhodanine (4.38 g.), indan-1,3-dione (2.92 g.), ethanol (25 cc.) and triethylamine (3 cc.) were heated together on a steam-bath for 5 min. Concentrated hydrochloric acid (2.5 cc.) was added to the orange solution to give the solid dye. The soft maroon oxonol (5.0 g., 79%) was collected and washed with ethanol. It was dissolved in alcoholic triethylamine and the solution acidified to give soft maroon flakes, M.P. indef., soft ca. 165° C. onwards. It strongly sensitized a silver chlorobromide emulsion at 0.15 g./mole silver halide with a flat peak at 460–560 mµ extending to 620 mµ.

Example E.—3-allyl-5-hydroxybenzylidene-2-thiothiazolid-4-one

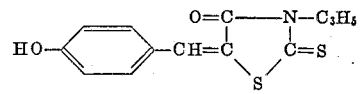

p-Hydroxybenzaldehyde (6.1 g.), 3-allylrhodanine (8.65 g.), ethanol (10 cc.) and piperidine (5 cc.) were heated on a steam-bath for 10 min. Acetic acid (5 cc.) was added followed by water. The whole solidified. It (11.9 g., 86%) formed soft orange needles, M.P. 167–169° C. from benzene-petroleum.

Example F.—3-ethyl-5-o-hydroxybenzylidene-2-thiothiazolid-4-one

This compound was prepared by the procedure of R. Andreasch et al., Monatshefte F. Chemie, 25, p. 174 (1904), wherein salicylaldehyde was condensed with 3-ethylrhodanine to give orange-yellow needles, M.P. about 190° C.

Example G.—3-ethyl-5-(2,2-dicyanovinyl)-4-hydroxythiazolin-2-thione

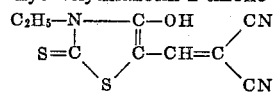

5-ethoxymethylene-3-ethylrhodanine (6.5 g.), melononitrile (2.0 g.), ethanol (25 cc.) and triethylamine (4.5 cc.) were heated together for 5 min. on a steam-bath. Water (100 cc.) was added to the orange solution and, after cooling, concentrated hydrochloric acid (8 cc.) was added gradually. The required compound (6.3 g., 88%) crystallized. It is difficult to recrystallize and involves considerable loss. A sample from ethanol formed brown crystals, M.P. ca. 126° C. softening at 75° C. and containing ethanol of crystallization. The triethylamine may be replaced by an equivalent of sodium in alcohol. It dyes wool an orange-yellow colour. It sensitizes a chlorobromide emulsion at 0.05 g./mole silver halide with a peak at 510 mµ.

Example H.—3-ethyl-5-(2-cyano-2-ethoxycarbonylvinyl)-4-hydroxythiazolin-2-thione 5-ethoxymethylene-3-ethylrhodanine (2.2 g.), ethyl cyanoacetate (1.1 cc.), ethanol (10 cc.) and triethylamine (1.5 cc.) were heated together on a steam-bath for 5 min. Water (100 cc.) was added to the orange solution followed by concentrated hydrochloric acid (10 cc.). An orange tar precipitated. The aqueous liquor was decanted and the tar washed with water. It was then dissolved in cold ethanol and water was added gradually until just not cloudy. Scratching the walls of the flask then induced crystallization. As crystallization proceeded more water was dripped in. After complete crystallization, the whole was chilled overnight and the crystals collected and washed with aqueous ethanol (3:1). It (1.4 g., 50%) formed pale yellow crystals, M.P. 128–130 °C. softening at 177° C. from acetic acid. It strongly sensitizes a silver chlorobromide emulsion at 0.05 g./mole silver halide and a silver iodobromide emulsion at 0.10 g./mole silver halide with peaks at 510 mμ extending to 570 mμ.

Example I.—3-ethyl-5-(2-cyano-2-p-nitrophenylvinyl)-4-hydroxythiazolin-2-thione (Na-salt)

Sodium (0.46 g.) was dissolved in ethanol (25 cc.) and p-nitrophenylacetonitrile (3.24 g.) added. 5-ethoxymethylene-3-ethylrhodanine (4.34 g.) was added to the red solution and the whole was heated for 2–3 min. on a steambath. The required Na-salt separated rapidly. Ether (25 cc.) was added and the green crystals collected. (Yield 6.1 g., 86%). A sample from ethanol-ether formed soft green crystals shrinking at 208–210° C. It dyes wools a navy-blue shade.

Example J.—3-ethyl-5-(4-hydroxy-1-isochromen-3-ylmethylene)-2-thiooxazolid-4-one Isochroman-1,4-dione (4.0 g.), acetic anhydride (10 cc.) and ethyl orthoformate (50 cc.) were refluxed on a gauze for 1 hr. and the solvents removed in vacuum. The solid residue of 3-ethoxy-methyleneisochroman-1,4-dione (2.0 g., 37%) formed soft, straw-coloured needles, M.P. 152–153° C. from ethanol.

3-ethoxymethyleneisochroman-1,4-dione (1.05 g.), 3-ethyl-2-thiooxazolid-4-one (0.75 g.), ethanol (5 cc.) and triethylamine (0.8 cc.) were heated together on a steambath for 5 min. Concentrated hydrochloric acid was then added gradually to the magenta solution until the colour changed to yellow. The dye crystallized on chilling. It (0.5 g., 33%) formed flat, rust-coloured needles, M.P. ca. 250–260° C. (decomp. previous darkening).

Example K.—Anhydro - 3 - ethyl-5-(4-hydroxy-1-oxoisochromen - 3 - ylmethylene) - 2 - methylthio - 4 - oxothiazolinium hydroxide

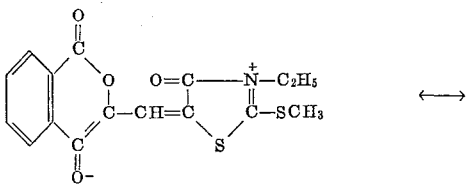
↔
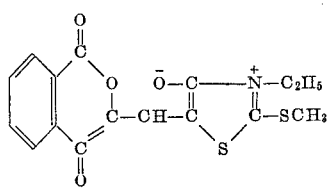

The dye of Example B (3.33 g.) was dissolved in a solution of sodium (0.23 g.) in methanol (25 cc.). Methyl iodide (1.5 cc.) was added and the whole was refluxed for 2 hrs. The grey-green crystalline powder which had separated was washed with alcoholic triethylamine. It (2.75 g., 79%) formed soft, deep maroon crystals, M.P. 268° C. (efferescence) softening from 180° C. from dimethylformamide.

Example L.—Anhydro - 3 - ethoxycarbonylmethyl - 5 - (4 - hydroxy - 1 - oxoisochromen - 3 - ylmethylene)-2-methylthio-4-oxothiazolinium hydroxide

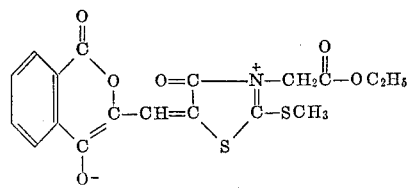

The dye of Example A (2.55 g.) was dissolved in a solution of sodium (0.15 g.) in methanol (25 cc.) and the solution was filtered. Methyl iodide (3 cc.) was added, the flask was stoppered and stood at room temperature for 24 hrs. A solid separated after a few hours. The solid was slurried with isopropanol and collected. It (1.6 g., 60%) formed soft bronzy-green threads, M.P. 212–214° C.

Example M.—Anhydro-3-ethyl-5-(3-hydroxy-1-oxoinden-2 - ylmethylene) - 2 - methylthio - 4 - oxothiazolinium hydroxide The dye of Example D (3.17 g.) was added to a solution of sodium (0.23 g.) in methanol (50 cc.). The mixture was heated to dissolve, methyl iodide (2.5 cc.) was added and the whole refluxed for 30 min. After 10 min. the required substance commenced to separate. The mixture was cooled, the solid collected and washed with methanol. It (2.8 g., 84.5%) formed an orange, crystalline powder. From dimethylformamide-ethanol it formed bright orange-red needles, M.P. 251–252° C. softening at 245° C.

Example N.—Anhydro-3-ethyl-5-(α-cyano-4-nitrostyryl)-4-hydroxy-2-methylthiothiazolium hydroxide

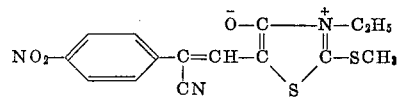

The dye of Example I (1 g.), methanol (25 cc.) and methyl iodide (1 cc.) were refluxed together for 1 hr. The purple colour had by then largely faded and a greyblack, crystalline powder had separated. It (0.95 g., 97%) formed a steel-grey crystalline powder from dimethylformamide, decomposing from 268° C. onwards.

Similarly the intermediates of Formula V in which q is the integer 2 are prepared to advantage by using the well-known intermediate

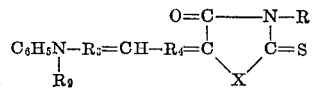

wherein R, $R_3$, $R_4$ and X are as defined previously and $R_9$ represents the hydrogen atom or a

alkyl group, in place of the compound

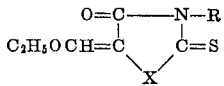

The following examples will serve to illustrate more fully the manner whereby I practice the invention.

Example 1.—Anhydro[3 - ethyl - 2 - benzothiazole][3-ethoxycarbonylmethyl - 5 - (4 - hydroxy - 1 - oxoisochromen - 3 - ylmethylene) - 4 - oxo - 2 -thiazoline] methinecyanine hydroxide

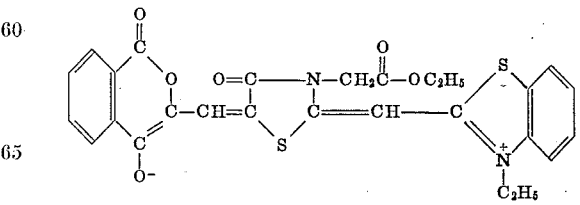

The compound of above Example A (1 g.) and methyl sulphate (1 cc.) in a boiling tube were heated at 170° C. in an oil bath for 5 min. while grinding the dye against the walls of the tube with a glass rod. Quaternization occurred to give a red tar. The latter was treated with ether, again grinding with the rod. This was repeated until the ether remained colourless. This technique was applied in all subsequent examples of quaternization. 3- ethyl-2-methylbenzothiazolium iodide (0.8 g.), pyridine (5 cc.) and triethylamine (0.8 cc.) were added and the whole was heated on a steam-bath for 5 min. agitating with the rod until dissolved. A thick precipitate of dye was given. Ethanol (25 cc.) was added and the slurry chilled. The dye was collected and washed free from a red impurity with ethanol. From pyridine-ethanol (blue-green) it (0.4 g., 29%) formed bronze threads, M.P. 261–262° C. It was a photographic sensitizer. Its hydrochloride,

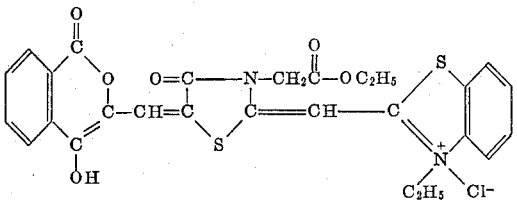

forms maroon crystals, M.P. 250–254° C. and is obtained by adding concentrated hydrochloric acid to the acetic acid solution of its base.

Example 2.—Anhydro - [1 - methyl - 4 - quinoline][3-ethoxycarbonylmethyl - 5 - (4 - hydroxy - 1 - oxoisochromen - 3 - ylmethylene) - 4 - oxo - 2 - thiazoline]methinecyanine hydroxide This compound was obtained by the procedure of above Example 1 by replacing the 3-ethyl-2-methylbenzothiazolium iodide therein with lepidine metho-p-toluenesulphonate (0.9 g.). The dye separated during the reaction. It (0.35 g., 26.5%) formed a bronze crystalline powder, M.P. 276° C., from dimethylformamide-ethanol. It desensitized a photographic emulsion.

Example 3.—Anhydro-[3 - ethyl - 2 - benzoxazole][3-ethoxycarbonylmethyl - 5 - (4 - hydroxyisochromen-3-ylmethylene) - 4 - oxo - 2 - thiazoline]methinecyanine hydroxide The compound of above Example A (2 g.) and methyl sulphate (2 cc.) were heated together in an oil bath at 160° C. for 5 min. and the quaternary salt was washed with ether. 3-ethyl-2-methylbenzoxazolium iodide (1.5 g.), pyridine (10 cc.) and triethylamine (1.5 cc.) were added and the whole was heated in a steam-bath for 5 min. Isopropanol (30 cc.) was added and the dye collected after chilling for 3 hr. The soft, green threads (0.35 g., 13%) were washed well with ethanol and obtained as brassy, soft, green threads, M.P. ca. 275° C. (decomp.) from pyridine-ethanol. It sensitized a silver chlorobromide emulsion with a peak at 670 mμ.

Example 4.—Anhydro-[3-ethyl - 2 - benzothiazole][3-ethoxycarbonylmethyl-5-(4-hydroxy - 2 - oxochromen-3-ylmethylene) - 4 - oxo - 2 - thiazoline]methinecyanine hydroxide

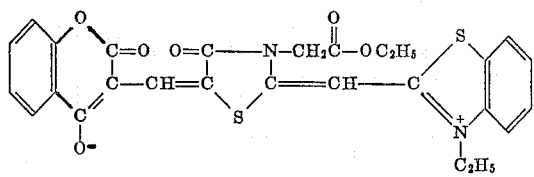

The compound of above Example C (1 g.) was quaternized with methyl sulphate (0.5 cc.) at 155° C. for 30 seconds after complete fusion (ca. 1 min.). The quaternary salt was washed with ether and heated for 5 min. on a steam-bath with 3-ethyl-2-methylbenzothiazolium iodide (0.8 g.), pyridine (5 cc.) and trimethylamine (0.5 cc.). Ethanol (25 cc.) was added and the whole chilled. The dye crystallized. It (0.65 g., 35%) formed fine, dark-red crystals, M.P. 285–286° C., from pyridine (magenta)-ethanol. It sensitized a silver chlorobromide emulsion well with peaks at 520 and 570 mμ.

Example 5.—Anhydro - [1 - ethyl-2-quinoline][3-ethoxycarbonylmethyl-5-(4 - hydroxy - 2 - oxochromen-3-ylmethylene) - 4 - oxo - 2 - thiazoline]methinecyanine hydroxide The compound of above Example C (1.0 g.) was quaternized as in Example 4 and heated on a steam-bath for 5 min. with quinaldine etho-p-toluenesulphonate (0.9 g.), pyridine (5 cc.) and triethylamine (1 cc.). Ethanol (20 cc.) was added to the purple solution followed by ether (30 cc.). On chilling the dye crystallized. It (0.45 g., 33%) formed soft green flakes, M.P. ca. 190° C. (soft at 186° C.) pyridine (blue)-ethanol.

Example 6.—Anhydro - [3 - ethyl - 2 - benzoxazole][3-ethoxycarbonylmethyl - 5 - (4-hydroxy - 2 - oxochromen-3-ylmethylene) - 4 - oxo - 2 - thiazoline]methinecyanine hydroxide Proceeding as in Example 5 but replacing the quinaldinium salt by 3-ethyl-2-methylbenzoxazolium iodide (0.8 g.), the dye was obtained by the addition of ether to the reaction mixture. It (0.4 g., 30%) formed soft rose needles, M.P. 279–283° C. from a little pyridine with 4 vols. ethanol. It sensitized a silver chlorobromide emulsion.

Example 7.—Anhydro - [3-allyl-5-p-hydroxybenzylidene-4 - oxo - 2 - thiazoline][3 - ethyl - 2 - benzothiazole]methinecyanine hydroxide

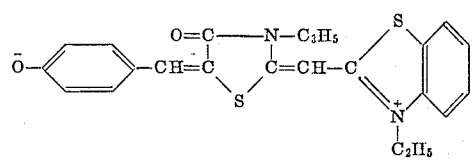

The compound of above Example E (1.4 g.) and methyl sulphate (0.6 cc.) were heated together on a steam-bath for 15 min. to give a solid quaternary salt. The latter was washed with ether, 3-ethyl-2-methylbenzothiazolium iodide (1.55 g.), pyridine (5. cc.) and triethylamine (1.5 cc.) were added and the whole was heated for 15 min. on a steam-bath. Ethanol (25 cc.) was added to precipitate the dye. It was collected after chilling. It (0.65 g., 31%) was boiled up with pyridine containing a little strong ammonia and obtained as green crystals, M.P. ca. 275° C. (shrinks at 260–270° C.). It sensitized a silver chlorobromide with a peak at 560 mμ.

Example 8.—Anhydro-[3 - ethyl - 2 - benzothiazole][5-(2,2-dicyanovinyl)-3-ethyl - 4 - hydroxy - 2 - thiazole]methinecyanine hydroxide

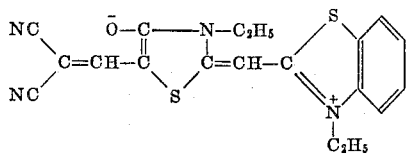

The compound of above Example G (2.4 g.) and methyl sulphate (1.3 cc.) were heated together on a steam-bath for 10 min. and the resulting quaternary salt was washed with ether. 3-ethyl-2-methylbenzothiazolium iodide (3.1 g.), pyridine (10 cc.) and triethylamine (3.5 cc.) were added and the whole heated for 10 min. on a steam-bath. A thick meal of crystals separated. The slurry was diluted with ethanol (25 cc.) and chilled. The dye (2.45 g., 64%) formed bronze threads or glittering green crystals, M.P. 278–279° C. from dimethylformamide-ethanol. It is a moderate sensitizer for a chlorobromide emulsion at 0.1 g./mole silver halide with a peak at 570 mμ extending to 610 mμ.

Example 9.—Anhydro-[3-ethyl - 2 - benzothiazole][3-ethyl-5-(3 - hydroxy - 1 - oxoinden-2-ylmethylene)-4-oxo-2-thiazoline]methinecyanine hydroxide

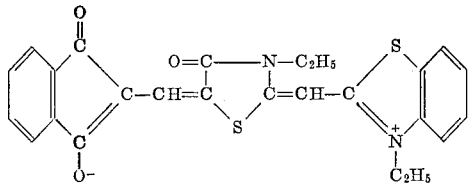

The compound of above Example D (1.05 g.) and methyl sulphate (0.5 cc.) were heated together at 145° C. for 5 min. The quaternary salt solidified and was then washed with ether. 3-ethyl-2-methylbenzothiazolium iodide (1.0 g.), pyridine (10 cc.) and triethylamine (1.5 cc.) were added and heated together on a steam-bath for 5 min. The required dye separated rapidly. Ethanol (30 cc.) was added, the dye was collected and washed with ethanol. It (1.4 g., 91.5%) formed soft maroon threads, M.P. indef., from dimethylformamide-ethanol. It was a photographic sensitizer with a peak at 590 m$\mu$.

Example 10.—3-ethoxycarbonylmethyl - 5 - [3-ethoxycarbonylmethyl-5-(4 - hydroxy - 1 - oxoisochromen-3-ylmethylene) - 4 - oxothiazolidin - 2 - ylidene]-2-thiothiazolid-4-one

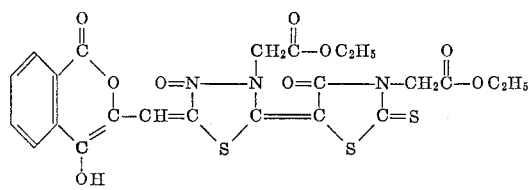

The compound of above Example A (1 g.) was quaternized as in Example 1 and washed with ether. 3-ethoxycarbonylmethylrhodanine (0.65 g.), pyridine (5 cc.) and triethylamine (1 cc.) were added and the whole was heated on a steam-bath for 5 min. The dye salt was precipitated as a tar by the addition of ether (50 cc.), washed with ether by decantation, dissolved in ethanol (10 cc.) and acidified by concentrated hydrochloric acid. The solid dye thus obtained (0.5 g., 34%) was dissolved in hot alcoholic triethylamine (violet) and the solution was acidified with strong hydrochloric acid. It formed soft maroon flakes, M.P. 268° C. (decomp. from 235° C.). It sensitized a silver chlorobromide emulsion efficiently with desensitization at 0.02 g./mole silver halide with peaks at 630 and 690 m$\mu$ extending to 720 m$\mu$.

Example 11.—3-ethoxycarbonylmethyl - 5 - [3-ethoxycarbonylmethyl - 5 - (4 - hydroxy - 2 - oxochromen-3-ylmethylene) - 4 - oxothiazolidin - 2 - ylidene]-2-thiothiazolid-4-one The compound of above Example C (1 g.) was quaternized with methyl sulphate (0.3 cc.) at 155° C. for 30 sec. after fusion. 3-ethoxycarbonylmethylrhodanine (0.65 g.), pyridine (5 cc.) and triethylamine (1 cc.) were added and the whole was heated on a steam-bath for 2 min. Isopropanol (20 cc.) was added, and the solution was acidified with concentrated hydrochloric acid. The precipitated solid (0.75 g., 51%) was purified by dissolution in alcoholic triethylamine followed by acidification with concentrated hydrochloric acid. It formed soft, orange threads, M.P. 283° C. (prev. soft.). It or its salts are strong sensitizers for a silver chlorobromide emulsion at 0.05 g./mole silver with a peak at 590 m$\mu$ extending to 660 m$\mu$ and for a silver iodobromide emulsion at 0.10 g./mole silver with a peak at 580 m$\mu$.

Example 12.—5-[3-ethoxycarbonylmethyl-5-(4-hydroxy-2-oxochromen - 3 - ylmethylene)-4-oxothiazolidin-2-ylidene]-3-ethyl-2-thiooxazolid-4-one The quaternary salt, as obtained in Example 11, 3-ethyl-2-thiooxazolid-4-one (0.5 g.), pyridine (5 cc.) and triethylamine (1 cc.) were heated together on a steam-bath for 5 min. Ethanol (20 cc.) was added followed by 2 N-hydrochloric acid until the solution just remained clear. On chilling, the dye crystallized. It (0.55 g., 43%) formed soft, orange-red threads, M.P. 301–302° C. on acidification (HCl) of its hot alcoholic triethylamine solution. It was a strong sensitizer for silver chlorobromide at 0.05 g./mole silver with peaks at 520 and 560 m$\mu$ extending to 600 m$\mu$, and a moderate sensitizer for silver iodobromide at 0.03 g./mole silver.

Example 13.—5 - [3 - ethoxycarbonylmethyl - 5 - (4-hydroxy - 1 - oxoisochromen - 3 - ylmethylene) - 4-oxothiazolidin - 2 - ylidene] - 3 - ethyl - 2 - thiooxazolid - 4 - one The quaternary salt, as obtained in Example 10, was treated in the same way as that of Example 12. The dye, obtained on acidifying the reaction mixture (1.1 g., 86%), was dissolved in hot alcoholic triethylamine (purple) and the solution was acidified with concentrated hydrochloric acid. It formed soft, rusty-red flakes, M.P. softening from 255° C. It sensitized a silver chlorobromide emulsion at 0.05 g./mole silver with peaks at 625 and 680 m$\mu$.

Example 14.—4 - [3 - ethoxycarbonylmethyl - 5 - (4-hydroxy - 2 - oxochromen - 3 - ylmethylene) - 4 - oxothiazolidin - 2 - ylidene] - 2 - ethylthiothiazol - 5 - one

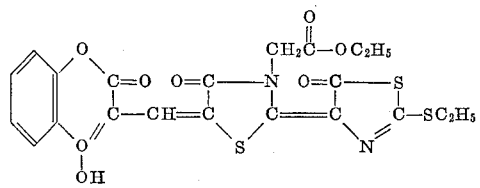

The compound of above Example C (1.3 g.) was quaternized by heating it with methyl sulphate (0.5 cc.) at 155° C. for 30 sec. after fusion (1–2 min.). N-dithioethoxycarbonylglycine (1.2 g.) and acetic anhydride (10 cc.) were heated together at 130° C. for 30 min. and the solvent removed. The residue was washed into the quaternary salt with pyridine (5 cc.) and triethylamine (1.5 cc.) and the mixture heated on a steam-bath for 5 min. Ethanol (30 cc.), then concentrated hydrochloric acid (5 cc.) were added followed by 2 N-hydrochloric acid (15 cc.) to precipitate a tar which solidified on chilling. The black solid was dissolved in alcoholic triethylamine (orange-red) and acidified with concentrated hydrochloric acid. A bronze-black powder, M.P. ca. 276° C. separated. (Yield 0.2 g., 11%.) It sensitized a silver chlorobromide emulsion strongly at 0.05 g./mole silver with a peak at 560 m$\mu$ extending to 610 m$\mu$.

Example 15.—3 - ethyl - 5 - [3 - ethyl - 5 - (3 - hydroxy-1 - oxoinden - 2 - ylmethylene) - 4 - oxothiazolidin - 2-ylidene]-2-thiothiazolid-4-one.

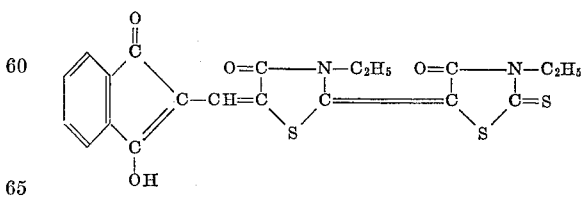

The compound of above Example D was quaternized as in Example 9 and heated with 3-ethylrhodanine (0.7 g.), pyridine (10 cc.) and triethylamine (2 cc.) for 5 min. on a steam-bath. The solution was diluted with ethanol (25 cc.) and concentrated hydrochloric acid (3 cc.) added. The dye precipitated. It (1.45 g., 100%) was dissolved in hot alcoholic triethylamine (magenta) and the solution acidified to give a black crystalline powder of indefinite M.P. It was a strong sensitizer at 0.05 g./mole silver chlorobromide with a peak at 630 m$\mu$ extending to Example 16.—2 - diphenylamino - 5 - [3 - ethyl - 5 - (3 - hydroxy - 1 - oxoinden - 2 - ylmethylene) - 4 - oxothiazolidin-2-ylidene]thiazolin-4-one

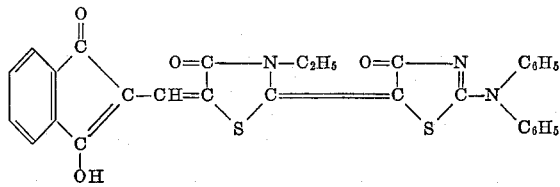

(a) The compound of above Example D was quaternized as in Example 9. 2-diphenylaminothiazol-4-one (0.9 g.), pyridine (5 cc.) and triethylamine (1.5 cc.) were added and heated together for 5 min. on a steam-bath. Ethanol (30 cc.) was added followed by acetic acid (4 cc.). The dye crystallized on chilling. It (1.75 g., 96%) formed glittering, green crystals, M.P. 271–272° C. from pyridine-ethanol. It was a photographic sensitizer.

(b) The compound of above Example M (3.3 g.), 2-diphenylaminothiazol-4-one (2.7 g.), dimethylformamide (15 cc.) and triethylamino (1.5 cc.) were heated together on a steam-bath for 10 min. Ethanol (25 cc.) was added followed by 2 N hydrochloric acid (10 cc.). The dye separated in 90% yield and was purified as above under (a).

Example 17.—3 - ethoxycarbonylmethyl - 5 - [ - ethoxycarbonylmethyl - 5 - (4 - hydroxy - 1 - oxoisochromen - 3 - ylmethylene) - 4 - oxothiazolidin - 2 - ylideneethylidene]-2-thiothiazolid-4-one The compound of above Example A (1.3 g.) and methyl sulphate(1.0 cc.) were fused at 170° C. for 4–5 min. and the resulting tar was washed with ether. 3-ethoxycarbonylmethyl - 5 - ethylidenerhodanine (Knott, J. Chem. Soc., 1954, 1490) (0.85 g.), pyridine (5 cc.) and triethylamine (1 cc.) were added and the whole refluxed on a steam-bath for 5 min. Ethanol (20 cc.) and acetic acid (3 cc.) were added and the slurry chilled. The solid was dissolved in alcoholic triethylamine and the dye precipitated with acetic acid. It (0.25 g., 12.5%) was obtained as soft green threads, M.P. ca. 240° C., on adding acetic acid to its hot solution in alcoholic triethylamine. It sensitized a silver chlorobromide emulsion at 0.05 g./mole silver with a peak at 690 mµ extending to 720 mµ.

Example 18.—3 - ethoxycarbonylmethyl - 5 - {2 - [3 - ethyl - 5 - (4 - hydroxy - 1 - oxoisochromen - 3 - ylmethylene) - 4 - oxothiazolidin - 2 - ylidene] - 1 - ethylthioethylidene}-2-thiothiazolid-4-one

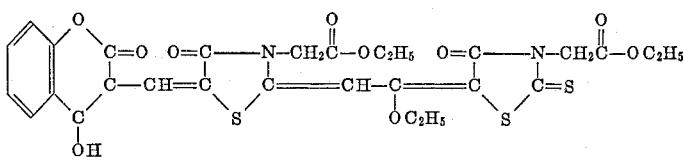

(a) The compound of above Example B (1.1 g.) and methyl sulphate (1.0 cc.) were fused at 170° C. for 5 min. (or until effervescence starts), cooled and the salt was washed with ether. 3-ethoxycarbonylmethyl-5-1'-ethylthioethylidenerhodanine (Knott, J. Chem. Soc., 1954, 1482) (1.0 g.), pyridine (5 cc.) and triethylamine (1.0 cc.) were added and the whole was heated for 5 min. on a steambath. Ethanol (20 cc.) was added followed by acetic acid (5 cc.). The dye (0.8 g., 40%) crystallized. It was dissolved in ethanolic triethylamine and the green solution was acidified with acetic acid. It formed brilliant, green crystals, M.P. 270–280° C. (dec.) and desensitized a photographic emulsion.

(b) The dye of Example K (3.47 g.), 3-ethoxycarbonylmethyl - 5 - 1' - ethylthioethylidenerhodanine (3.05 g.), dimethylformamide (15 cc.) and trimethylamine (1.5 cc.) were heated together on a steam-bath for 10 min. and acidified with 2 N hydrochloric acid. The dye crystallized in 90% yield and was purified as in (a).

Example 19.—3 - ethoxycarbonylmethyl - 5 - {1 - ethoxy - 2 - [3 - ethoxycarbonylmethyl - 5 - (4 - hydroxy - 2 - oxochromen - 3 - ylmethylene) - 4 - oxothiazolidin-2-ylidene]ethylidene}-2-thiothiazolid-4-one

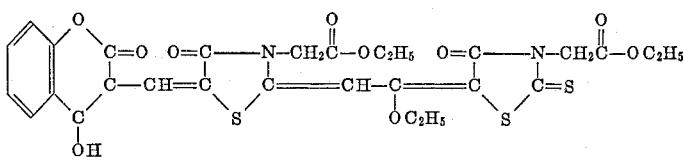

The compound of above Example C (1.3 g.) was quaternized as in Example 14, and the resulting quaternary salt was heated with 3-ethylcarbonylmethyl-5-1'-ethoxyethylidenerhodanine (E. B. Knott, J. Chem. Soc., 1954, 1482–90) (1.0 g.) was heated for 5 min. on a steam-bath in pyridine (5 cc.) and triethylamine (1.0 cc.). Ethanol (25 cc.) was added followed by concentrated hydrochloric acid (5 cc.). Water (10 cc.) was run in to give a thick orange-brown meal. The dye (1.35 g., 62.5%) was collected, washed with ethanol and dissolved in alcoholic triethylamine (magenta). A mixture of ethanol and concentrated hydrochloric acid was then run in until the colour changed to orange. The dye, which crystallized, formed soft maroon crystals, M.P. ca. 242° C. (prev. softening). It sensitized a silver chlorobromide strongly at 0.05 g./mole silver with a peak at 630 mµ extending to 710 mµ.

Example 20.—3 - ethoxycarbonylmethyl - 5 - {1 - ethoxy - 2 - [3 - ethoxycarbonylmethyl - 5 - (4 - hydroxy - 1 - oxoisochromen - 3 - ylmethylene) - 4 - oxothiazolidin - 2 - ylidene]ethylidene} - 2 - thiothiazolid - 4 - one This dye was obtained by the procedure of above Example 19 except that the intermediate was the compound of Example A, in 25% yield, as soft maroon threads, softening ca. 250° C. It sensitized a silver chlorobromide emulsion with desensitization at 0.05 g./mole silver and peak at 750 mµ extending to 790 mµ.

Example 21.—3 - allyl -5 - (3 - allyl - 5 - p - hydroxybenzylidene - 4 - oxothiazolidin - 2 - ylidene) - 2 - thiothiazolid - 4 - one

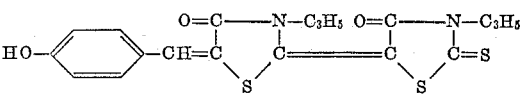

The compound of above Example E was quaternized as in Example 7. 3-allylrhodanine (0.9 g.), pyridine (5 cc.) and triethylamine (1.6 cc.) were added and the whole was heated for 15 min. on a steam-bath. Ethanol (25 cc.) was added followed by concentrated hydrochloric acid (8 cc.). The dye was precipitated as a tar. It was washed with water by decantation, dissolved in ethanol (50 cc.), triethylamine (5 cc.) and water (100 cc.) were added, and the magenta solution was concentrated on a steam-bath. As the alcoholic triethylamine distilled the substance crystallized as maroon threads. It (0.6 g., 28.5%) was purified by a repetition of the above procedure and obtained as soft, brick-red threads, M.P. 252–253° C. It was a good sensitizer for a silver chlorobromide emulsion at 0.05 g./mole silver with peaks at 530 and 565 mµ extending to 600 mµ.

Example 22.—3 - ethyl - 5 - [3 - ethyl - 5 - o - hydroxybenzylidene - 4 - oxo - thiazolidin - 2 - ylidene] - 2-thiothiazolid - 4 - one This dye was obtained by the procedure of above Example 21 except that the intermediate was the compound of Example F. It (10% yield) formed a fine reddish, crystalline powder, M.P. indefinite (soft at ca. 230° C.). At 0.05 g./mole silver chlorobromide it sensitized efficiently with desensitization and a peak at 525 mμ.

Example 23.—5 - [5 - (2,2 - dicyanovinyl) - 3 - ethyl - 4-hydroxythiazolin - 2 - ylidene] - 3 - ethyl - 2 - thiothiazolid - 4 - one

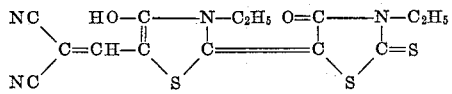

The compound of above Example G (1.2 g.) and methyl sulphate (0.7 cc.) were fused together on a steam-bath for 10 min. and the salt was washed with ether. 3-ethylrhodanine (0.9 g.), pyridine (5 cc.) and triethylamine (15 cc.) were added and the whole was heated on a steam-bath for 5 min. Ethanol (25 cc.) was added to the magenta solution followed by concentrated hydrochloric acid (8 cc.). The orange precipitate was washed with ethanol. It (0.85 g., 46%) was dissolved in hot alcoholic triethylamine (75 cc.) and the rosy-red solution acidified with hydrochloric acid. It crystallized as maroon threads, M.P. 196–198° C. It is a strong sensitizer at 0.05 g./mole silver chlorobromide and at 0.03 g./mole silver iodobromide with peaks at 580 mμ and 575 mμ respectively.

Example 24.—5 - [5 - (2 - cyano - 2 - ethoxycarbonylvinyl) - 3 - ethyl - 4 - hydroxythiazolin - 2 - ylidene]- 3 - ethyl - 2 - thiothiazolid - 4 - one The compound of above Example H (1.34 g.) and methyl sulphate (0.6 cc.) were heated for 5 min. on a steam-bath to give a solid quaternary salt. It was washed with ether, 3-ethylrhodanine (0.9 g.), pyridine (5 cc.) and triethylamine (1.5 cc.) were added and the whole was heated for 5 min. on a steam-bath. Ethanol (20 cc.) was added followed by concentrated hydrochloric acid (8 cc.). A black tar was precipitated which soon solidified. It (0.65 g., 32%) was obtained as fine, pale green aggregates, shrinking at 167° C., on acidifying its alcoholic triethylamine solution. It was an excellent sensitizer for silver chlorobromide at 0.05 g./mole silver, peak at 590 mμ extending to 660 mμ, and for an iodobromide emulsion at 0.03 g./mole silver, peak at 580 mμ extending to 630 mμ.

Example 25.—3 - ethyl - 5 - [3 - ethyl - 5 - (4 - hydroxy-1 - oxoisochromen - 3 - ylmethylene) - 4 - oxo - oxazolidin - 2 - ylidene] - 2 - thiothiazolid - 4 - one

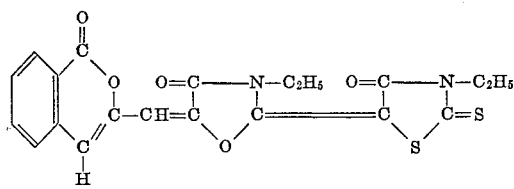

The compound of above Example J (0.95 g.) and methyl sulphate (0.5 cc.) were fused together at 160° C. for 30 sec. removing the tube from the oil bath at the first signs of effervescence. The resulting quaternary salt was washed with ether, 3-ethylrhodanine (0.5 g.), pyridine (5 cc.) and triethylamine (1.0 cc.) were added and the whole was refluxed for 5 min. on a steam-bath. The magenta solution was then treated with concentrated hydrochloric acid until the colour changed to orange and a tar separated. The tar was washed with water, dissolved in hot ethanol and the solution was chilled. It deposited an orange powder (0.1 g.) which was dissolved in alcoholic triethylamine. The magenta solution was acidified (HCl) and the dye, collected after chilling, was then obtained as an orange powder softening at 250° C.

Example 26.—5 - [5 - (α - cyano - 4 - nitrostyryl) - 3-ethyl - 4 - hydroxythiazolin - 2 - ylidene] - 3 - ethyl - 2-thiothiazolid - 4 - one

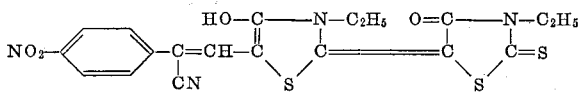

The compound of Example N (1.0 g.), 3-ethylrhodanine (0.5 g.), triethylamine (0.5 cc.) and dimethylformamide (10 cc.) were heated tobether on a steam-bath for 15 min. to give a deep blue solution. Ethanol (25 cc.) was added followed by glacial acetic acid (3 cc.). The required substance (1.2 g., 90.5%) crystallized on chilling as dark green, flat needles. It was dissolved in boiling alcoholic triethylamine and the solution, on acidification, yielded the dye as soft, dark green needles, M.P. 234° (effervescence).

As shown in a number of the preceding examples, the dyes of my invention are particularly useful in sensitizing photographic silver halide emulsions, serving to alter the sensitivity thereof in a most useful manner. For the preparation of photographic emulsions, the new dyes of the invention are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive-materials. Methanol, isopropanol, pyridine, etc., alone or in combination, have proven satisfactory as solvents for the majority of our new dyes. The type of silver halide emulsions that are used to advantage with my dyes include any of those prepared with hydrophilic colloids that are known to be satisfactory for dispersing light-sensitive silver halides, for example, emulsions prepared with hydrophilic colloids, such as, natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, etc.

The concentration of my new dyes in the emulsion can be widely varied, i.e., generally from about 10 to about 200 mg. per mole of silver halide. The specific concentration will vary according to the type of light-sensitive material in the emulsion and according to the effects desired. The most advantageous dye concentration for any given emulsion can be readily determined by making the tests and observations customarily used in the art of emulsion making. My emulsions are coated to advantage on any of the support materials used for photographic elements, for example, paper, glass, cellulose derivatives, such as cellulose acetate, cellulose acetatepropionate, cellulose nitrate, etc., synthetic resins, such as polystyrene, polyethylene terephthalate and other polyesters, polyamides such as nylon, and the like.

To prepare a gelatino-silver halide emulsion sensitized with one of my new dyes, the following procedure is satisfactory: A quantity of the dye is dissolved in a suitable solvent, and a volume of this solution containing the desired amount of dye is slowly added with intimate mixing to about 1,000 cc. of a light-sensitive gelatino-silver halide emulsion. With most of my dyes from about 1 to 20 mg. of dye per liter of emulsion suffices to produce the desired change in sensitivity with the ordinary light-sensitive gelatino-silver bromide (including the bromoiodide and chlorobromide) and fine-grain emulsions which include most of the ordinary employed light-sensitive gelatino-silver chloride emulsions. Whie the preceding has dealt with emulsions comprising gelatin, it will be understood that these remarks apply generally to any emulsions in which a part or all of the gelatin is substituted by another suitable hydrophilic colloid such as previously mentioned.

The above statements are only illustrative and are not to be understood as limiting my invention in any sense, as it will be apparent that the new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of my invention can also contain such addenda as chemical sensitizers, e.g., sulfur sensitizers (e.g., allyl thiocarbamide, thiourea, allylisothiocyanate, cystine, etc.), various gold compounds, (e.g., potassium chloroaurate, auric trichloride, etc.), (see U.S. Patents to W. D. Baldsiefen 2,540,085, granted Feb. 6, 1951; R. E. Damschroder 2,-597,856 granted May 27, 1952; and H. C. Yutzy et al. 2,597,915, granted May 27, 1952), various palladium compounds, such as palladium chloride (W. D. Baldsiefen U.S. 2,540,086, granted Feb. 6, 1951), potassium chloropalladate (R. E. Stauffer et al., U.S. 2,598,079, granted May 27, 1952), etc., or mixture of such sensitizers; antifoggants, such ammonium chloroplatinate (A. P. H. Trivelli et al. U.S. 2,566,245, granted Aug. 28, 1951), ammonium chloroplatinite (A. P. H. Trivelli et al., U.S. 2,566263, granted Aug. 28, 1951), benzotriazole, nitrobenzimidazole, 5-nitroindazole, benzidine, mercaptans, etc. (see Mees, "The Theory of the Photographic Process," Macmillan Pub., 1942, page 460), or mixtures thereof; hardeners, such as formaldehyde (A. Miller, U.S. 1,763,533, granted June 10, 1930), chrome alum (U.S. 1,763,533), glyoxal (J. Brunken U.S. 1,870,354, granted Aug. 9, 1932), dibromacrolein (O. Block et al., British 406,750, accepted Mar. 8, 1934), etc.; color couplers, such as those described in I. F. Salminen et al., U.S. Patent 2,423,730, granted July 7, 1947; Spence and Carroll U.S. Patent 2,640,776, issued June 2, 1953, etc.; or mixtures of such addenda. Dispersing agents for color couplers, such as those set forth in U.S. patents to E. E. Jelley et al., 2,322,027, granted June 15, 1943, and L. D. Mannes et al., 2,304,940, granted Dec. 15, 1942, can also be employed in the above-described emulsions.

The sensitizing effect shown for the various dye examples illustrating the invention was determined as follows: The dyes were tested in a silver chlorobromide emulsion, or a silver bromoiodide emulsion containing 0.77 mole percent iodide of the type described by Trivelli and Smith, Phot. Journal, 79, 330 (1939). The dyes, dissolved in suitable solvents, were added to separate portions of the emulsion in amounts in the range from about 40 to 130 mg./mole of silver halide. After digestion the emulsions were coated on a cellulose acetate film support. A sample of each coating was exposed on a sensitometer and to a wedge spectrograph, processed in a developer, fixed, washed and dried.

Some of my dyes are incorporated to advantage in hydrophilic colloid layers used for light filtering or antihalation purposes in photographic elements. For this purpose any of the hydrophilic colloids mentioned may be used as the binder.

The invention has been described in detail with particular reference to preferred embodiments thereof, but it will be understood that variations and modifications can be effected within the spirit and scope of the invention as described hereinabove and as defined in the appended claims.

I claim:

1. A light-sensitive photographic element comprising at least one hydrophilic colloid layer containing light-sensitive silver halide and at least one hydrophilic colloid layer containing a dye having a formula selected from the group consisting of

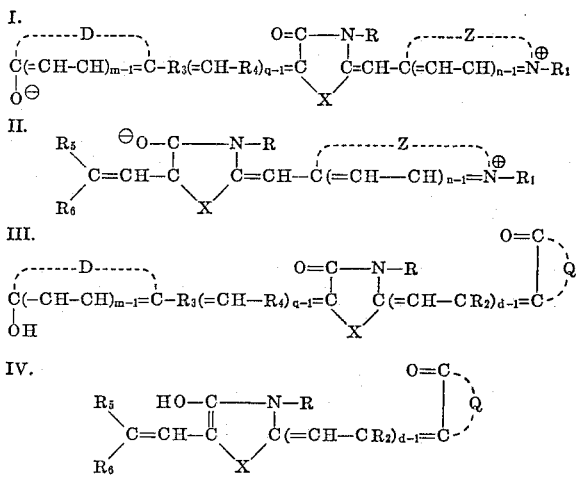

wherein $q$, $n$ and $d$ each represent an integer of from 1 to 2; R represents a group selected from the class consisting of a phenyl group and an alkyl group of from 1 to 12 carbon atoms; $R_1$ represents an alkyl group having from 1 to 12 carbon atoms; $R_2$ represents a member selected from the class consisting of the hydrogen atom, an alkoxy group and an alkylthio group; $R_3$ represents a methine group; $R_4$ represents a methine group; D represents a bivalent group selected from the class consisting of the

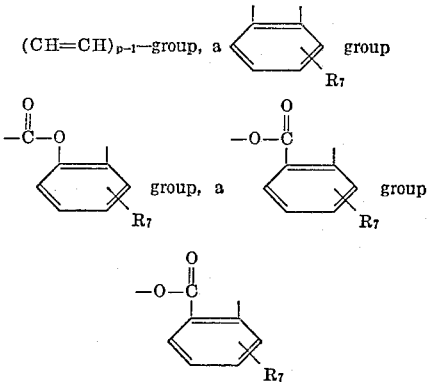

$m$ and $p$ each represent an integer of from 1 to 2 and wherein $m$ is 1 $p$ is 2 and D is

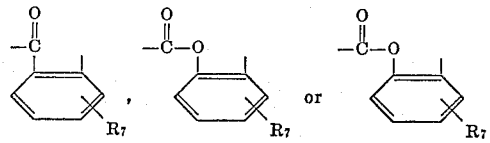

and when $m$ is 2 $p$ is 1 and D is vinylene or

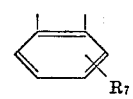

$R_5$ represents a group selected from the class consisting of the cyano group, the nitro group, a nitrophenyl group, a nitronaphthyl group, and a carbalkoxy group; $R_6$ represents the cyano group; $R_7$ represents a member selected from the class consisting of the hydrogen atom and an alkyl group; X represents a member selected from the class consisting of sulfur, selenium, oxygen and —$NR_0$; $R_0$ represents a member selected from the class consisting of hydrogen, an alkyl group and an aryl group; Z represents the nonmetallic atoms required to complete a 5- to 6-membered heterocyclic nucleus selected from the class consisting of a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3,3-dialkylindolenine nucleus, a 2-pyridine nucleus, a 4-pyridine nucleus, an imidaloze nucleus; a benzimidazole nucleus and a naphthimidazole nucleus; and Q represents the nonmetallic atoms required to complete a 5- to 6-membered heterocyclic ring selected from the class consisting of a thiazolone nucleus, an oxazolone nucleus, an imidazolone nucleus, a thionaphthenone nucleus, a pyrazolone nucleus, an oxindole nucleus, a barbituric acid nucleus, a thiobarbituric acid nucleus, a 3,4-dihydro - 2(1)-quinolone nucleus, a 3,4-dihydro-2(1)-quinoxalone nucleus, a 3-phenomorpholine nucleus and a 1,4,2-benzothiazine-3(4)-one nucleus.

2. A light-sensitive photographic element comprising at least one hydrophilic colloid layer containing light-sensitive silver halide and at least one hydrophilic colloid layer containing a dye having the formula:

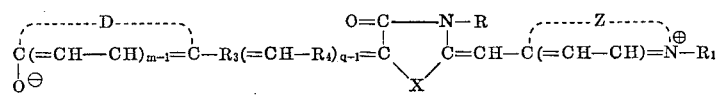

wherein $q$ and $n$ each represent an integer of from 1 to 2; R represents a group selected from the class consisting of a phenyl group and an alkyl group of from 1 to 12 carbon atoms; $R_1$ represents an alkyl group having from 1 to 12 carbon atoms; $R_3$ represents a methine group; $R_4$ represents a methine group; D represents a bivalent group selected from the class consisting of the

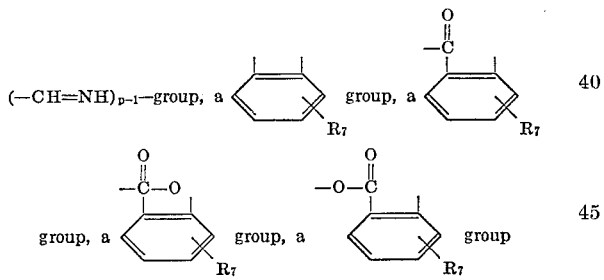

$m$ and $p$ each represent an integer of from 1 to 2 and wherein when $m$ is 1 $p$ is 2 and D is

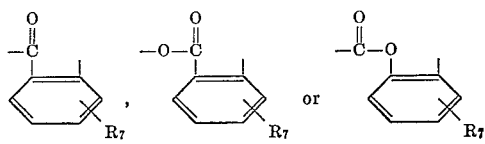

and when $m$ is 2 $p$ is 1 and D is vinylene or

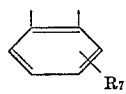

$R_7$ represents a member selected from the class consisting of the hydrogen atom and an alkyl group; X represents a member selected from the class consisting of sulfur, selenium, oxygen and $=NR_0$; $R_0$ represents a member selected from the class consisting of hydrogen, an alkyl group and an aryl group; Z represents the nonmetallic atoms required to complete a 5- to 6-membered heterocyclic nucleus selected from the class consisting of a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3,3-dialkylindolenine nucleus, a 2-pyridine nucleus, a 4-pyridine nucleus, an imidazole nucleus, a benzimidazole nucleus and a naphtimidazole nucleus.

3. A light-sensitive photographic element comprising at least one hydrophilic colloid layer containing light-sensitive silver halide and at least one hydrophilic colloid layer containing a dye having the formula:

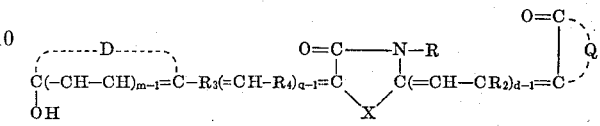

wherein $q$ and $d$ each represent an integer of from 1 to 2; R represents a group selected from the class consisting of a phenyl group, and an alkyl group having from 1 to 12 carbon atoms; $R_2$ represents a member selected from the class consisting of the hydrogen atom, an alkoxy group and an alkylthio group; $R_3$ represents a methine group; $R_4$ represents a methine group; D represents a bivalent group selected from the class consisting of the

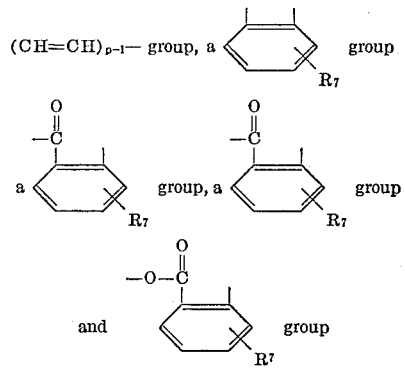

$m$ and $p$ each represent an integer of from 1 to 2 and wherein when $m$ is 1 $p$ is 2 and D is

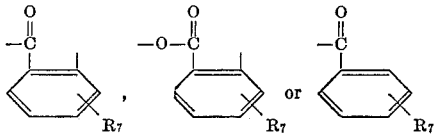

and when $m$ is 2 $p$ is 1 and D is vinylene or

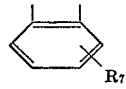

$R_7$ represents a member selected from the class consisting of the hydrogen atom and an alkyl group; X represents a member selected from the class consisting of sulfur, selenium, oxygen and $=NR_0$; $R_0$ represents a member selected from the class consisting of hydrogen, an alkyl group and an aryl group; and Q represents the nonmetallic atoms required to complete a 5- to 6-membered heterocyclic ring selected from the class consisting of a thiazolone nucleus, an oxazolone nucleus, an imidazolone nucleus, a thionaphthenone nucleus, a pyrazolone nucleus, an oxindole nucleus, a barbituric acid nucleus, a thiobarbituric acid nucleus, a 3,4-dihydro-2(1)-quinolone nucleus, a 3,4-dihydro-2(1)-quinoxalone nucleus, a 3-phenomorpholine nucleus and a 1,4,2-benzothiazine-3(4)-one nucleus.

4. A light-sensitive photographic element comprising at least one hydrophilic colloid layer containing light-sensitive silver halide and at least one hydrophilic colloid layer containing a dye having the formula:

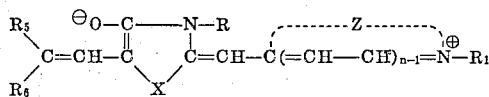

wherein $n$ represents an integer of from 1 to 2; R represents a group selected from the class consisting of a phenyl group and an alkyl group of from 1 to 12 carbon atoms; $R_1$ represents an alkyl group having from 1 to 12 carbon atoms; $R_5$ represents a group selected from the class consisting of the cyano group, the nitro group, a nitrophenyl group, a nitronaphthyl group, and a carbalkoxy group; $R_6$ represents the cyano group; X represents a member selected from the class consisting of sulfur, selenium, oxygen and $=NR_o$; $R_0$ represents a member selected from the class consisting of hydrogen, an alkyl group and an aryl group; and Z represents the nonmetallic atoms required to complete a 5- to 6-membered heterocyclic nucleus selected from the class consisting of a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3,3-dialkylindolenine nucleus, a 2-pyridine nucleus, a 4-pyridine nucleus, an imidazole nucleus, a benzimidazole nucleus and a naphthimidazole nucleus.

5. A light-sensitive photographic element comprising at least one hydrophilic colloid layer containing light-sensitive silver halide and at least one hydrophilic colloid layer containing a dye having the formula:

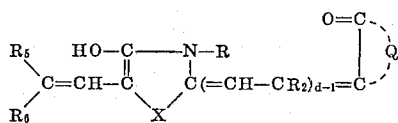

wherein $d$ represents an integer of from 1 to 2; R represents a group selected from the class consisting of a phenyl group and an alkyl group of from 1 to 12 carbon atoms; $R_2$ represents a member selected from the class consisting of hydrogen, an alkoxy group, and an alkthio group; $R_5$ represents a group selected from the class consisting of the cyano group, the nitro group, a nitrophenyl group, and a carbalkoxy group; $R_6$ represents the cyano group; X represents a member selected from the class consisting of sulfur, selenium, oxygen, and $=NR_o$; $R_0$ represents a member selected from the class consisting of hydrogen, an alkyl group, and an aryl group; and Q represents the nonmetallic atoms required to complete a 5- to 6-membered heterocyclic ring selected from the class consisting of a thiazolone nucleus, an oxazolone nucleus, an imidazolone nucleus, a thionaphthenone nucleus, a pyrazolone nucleus, an oxindole nucleus, a barbituric acid nucleus, a thiobarbituric acid nucleus, a 3,4-dihydro-2(1)-quinolone nucleus, a 3,4-dihydro-2(1)-quinoxalone nucleus, a 3-phenomorpholine nucleus and a 1,4,2-benzothiazine-3(4)-one nucleus.

6. A light-sensitive photographic element comprising at least one hydrophilic colloid layer containing light-sensitive silver halide and at least one hydrophilic colloid layer containing the dye 3-ethoxycarbonylmethyl-5-[3-ethoxycarbonylmethyl-5-(4-hydroxy - 2 - oxochromen-3-ylmethylene)-4-oxothiazolidin-2-ylidine]-2 - thiothiazolid-4-one.

7. A light-sensitive photographic element comprising at least one hydrophilic colloid layer containing light-sensitive silver halide and at least one hydrophilic colloid layer containing the dye 5-[3-ethoxycarbonylmethyl-5-(4-hydroxy-2-oxochromen - 3 - ylmethylene) - 4 - oxothiazolidin-2-ylidene]-3-ethyl-2-thiooxazolid-4-one.

8. A light-sensitive photographic element comprising at least one hydrophilic colloid layer containing light-sensitive silver halide and at least one hydrophilic colloid layer containing the dye 3-ethyl-5-[3-ethyl-5-(3-hydroxy-1-oxoindene - 2 - ylmethylene)-4-oxothiazolidin-2-ylidene]-2-thiothiazolid-4-one.

9. A light-sensitive photographic element comprising at least one hydrophilic colloid layer containing light-sensitive silver halide and at least one hydrophilic colloid layer containing the dye anhydro-[3-ethyl-2-benzothiazole]]3-ethoxycarbonylmethyl-5-(4 - hydroxy - 2 - oxochromen-3-ylmethylene)-4-oxo - 2 - thiazoline]methinecyanine hydroxide.

10. A light-sensitive photographic element comprising at least one hydrophilic colloid layer containing light-sensitive silver halide and at least one hydrophilic colloid layer containing the dye 5-[5-(2,2-dicyanovinyl)-3-ethyl-4-hydroxythiazolin-2-ylidene]-3 - ethyl - 2 - thiothiazolid-4-one.

References Cited

UNITED STATES PATENTS

| 2,895,955 | 7/1959 | Haseltine et al. | 260—240.5 |
| 2,984,664 | 5/1961 | Fry et al. | 260—240.5 |
| 2,304,981 | 12/1942 | Wilmanns | 96—106 |
| 2,870,014 | 1/1959 | Brooker et al. | 96—106 |

FOREIGN PATENTS

| 778,613 | 7/1957 | Great Britain. |

OTHER REFERENCES

Knott: Journal Chemical Society, pp. 402–410, (1963).
Knott: Journal Chemical Society, pp. 6204–9, (1964).

J. TRAVIS BROWN, *Primary Examiner.*

UNITED STATES PATENT OFFICE
CERTIFICATE OF CORRECTION

PO-1050 (5/69)

Patent No. 3,395,017  Dated  13 July 1968

Inventor(s)  Edward B. Knott

It is certified that error appears in the above-identified patent and that said Letters Patent are hereby corrected as shown below:

Column 20, line 55, second formula, "$\underset{-C-O}{\overset{O}{\|}}$" should be ---$\underset{-O-C-}{\overset{O}{\|}}$---. In the application, see page 5 of the amendment dated 10 Nov 67.

Column 21, line 8, "imidaloze" should be --- imidazole ---. In the application, see page 6, line 2 of amendment dated 10 Nov 1967.

Column 21, line 41, "(-CH=NH)" should be --- (-CH=CH) ---. In the application, see page 2 of the amendment dated 10 November 1967.

Column 22, line 32, "(CH=CH)" should be --- (-CH=CH) ---. In the application, see page 3 of the amendment dated 10 November 1967.

Column 22, line 35, in the right hand Formula, "$\underset{-C}{\overset{O}{\|}}$" should be ---$\underset{-C-O}{\overset{O}{\|}}$---. In the application, see page 3 of the amendment dated 10 Nov 67.

Column 22, line 49, "$\underset{-C}{\overset{O}{\|}}$" should be ---$\underset{-C-O}{\overset{O}{\|}}$---. In the application, see page 3 of the amendment dated 10 November 1967.

=4=

Signed and sealed this 11th day of May 1971.

(SEAL)
Attest:

EDWARD M. FLETCHER, JR.
Attesting Officer

WILLIAM E. SCHUYLER, JR.
Commissioner of Patents